United States Patent [19]

Arieh et al.

[11] 4,056,002
[45] Nov. 1, 1977

[54] COMPONENT FLOW RATE MEASUREMENT IN TWO-PHASE SYSTEMS

[75] Inventors: Simon Arieh, Geneva; Jean-Pierre Budliger, Onex, Geneva, both of Switzerland

[73] Assignee: Battelle Development Corporation, Columbus, Ohio

[21] Appl. No.: 723,494

[22] Filed: Sept. 15, 1976

[30] Foreign Application Priority Data

Sept. 19, 1975 Switzerland ............... 12225/75

[51] Int. Cl.² .................. G01F 1/06; G01F 5/00
[52] U.S. Cl. ............................. 73/194 R; 73/19; 73/195; 73/259; 364/510
[58] Field of Search ............ 73/194 M, 194 R, 253, 73/259, 194 E, 195, 200, 19, 29, 205 D; 176/19 R; 235/151.34

[56] References Cited

U.S. PATENT DOCUMENTS

| | | | |
|---|---|---|---|
| 2,141,977 | 12/1938 | Gray | 73/19 |
| 3,934,471 | 1/1976 | White et al. | 73/194 E |
| 3,968,678 | 7/1976 | Krener et al. | 73/19 |

Primary Examiner—James J. Gill
Attorney, Agent, or Firm—Barry S. Bissell

[57] ABSTRACT

Process and apparatus for accurately measuring the volume or mass flow rate of each component phase of a two-phase mixture. In particular, mixtures of crude oil and natural gas in changing proportions and having fluctuating differential flow velocities are encountered at the wellhead. The volume rate of flow of the oil and gas components are separately determined by temporarily isolating successive fractions of the mixture, determining the component proportions and the volume flow rate of each successive fraction and calculating the product thereof. Mass flow rate may be determined by incorporating the densities of the components into the calculation. Total throughput may be calculated by summing the products of the component proportion and the flow rate for all successive fractions.

8 Claims, 7 Drawing Figures

COMPONENT FLOW RATE MEASUREMENT IN TWO-PHASE SYSTEMS

BACKGROUND OF THE INVENTION

In many systems having two-phase flows, for example, in the petroleum and nuclear industries, there is a need at present for more efficient equipment for accurately determining the various parameters representing these two-phase flows, especially the rate of each one of their components.

There exist a number of conventional devices (one of which is shown in U.S. Pat. No. 3,934,471) which are applicable to the linear measurement of the rate of a mixed flow of gas and liquid phases. Devices of this type, however, give satisfactory results only in special cases such as in dilute mixtures where mimimal sliding or differential flow velocities exist between the two phases (low rates and nearly homogeneous flows). On the other hand, when the volumetric gas-liquid ratio exceeds a definite threshold, considerable sliding or slippage can occur between the two phases, which can result in inhomogeneous flows of various types: stratified, annular, or plug flows, for example. Variable pressure from the source of the flow, causing fluctuations in the separate flow velocities, exacerbates the difficulties encountered in accurate measurement. In cases like these, none of the existing devices is any longer capable of ensuring the accuracy required.

In order to overcome these difficulties, one often uses another technique, for instance when assessing the flow rate of a gas well. This technique consists of installing a separator on the outlet pipe of the well and measuring individually the rate of flow of each one of the phases. The main drawback of this method resides in the utilization of cumbersome and heavy equipment which is sometimes difficult to transport to well sites. Furthermore, the separators used at present for this type of measurement are not intended as a rule for a linear installation, and thus are not suitable for the continuous control of an individual well.

SUMMARY OF THE INVENTION

The purpose of the present invention is to correct the above-mentioned drawbacks. To this end, it is an object of the present invention to provide a process to perform the continuous measurement of the rate of each component of a fluid mixture consisting of a liquid and of a gas having fluctuating flow velocities and, therefore, differential flow rates. Characteristically, one isolates in time successive fractions of the flowing mixture at a reference pressure and sums the number of fractions thus isolated per unit of time thereby obtaining the mixture flow rate. One then varies the volume of each one of these fractions until one of the two properties, volume or pressure, representing these fractions, reaches a predetermined value. One measures the corresponding variation of the other of these properties and calculates from these volume-pressure variations the component proportions in each one of these fractions, and thus the instantaneous rate of flow of each component from the product of the mixture flow rate and the component proportions.

Another object of the present invention is to provide apparatus for the implementation of the process. Characteristically, the apparatus comprises a volumetric device having a chamber, an inlet aperture and a discharge aperture for the fluid mixture and a rotating fan unit inside the chamber, the fan unit having a plurality of retractable fan blades forming, along with internal walls of the chamber, a multiplicity of contractable cells. The rotary fan unit is arranged with respect to the chamber so as to move successively each one of the cells from the inlet aperture to the discharge aperture while subjecting the fluid in the cells to a volume contraction or expansion during the displacement. The apparatus further comprises means for measuring the variation in fluid pressure inside the cells and means for counting the number of cells passing the discharge aperture per unit of time. The output data from the volumetric device, consisting of the volume-pressure variations and the mixture flow rate, may comprise the input to a data processor which calculates the instantaneous individual component flow rates and which integrates over time to measure the total throughput of each component or the average flow rates.

FIGS. 1 and 2 graphically exhibit the wellknown theoretical relationships which form the bases for the inventive process.

DESCRIPTION OF THE INVENTION

The preferred flow rate measuring process consists essentially in isolating fixed, separate, successive fractions of the gas-liquid mixture so as to temporarily "freeze" during the period of measurement the sliding or slippage between the phases. The volume of each one of the thus isolated fractions is then varied so as to make use of the considerable difference in compressibility existing between the gas and the liquid. The pressure change due to the volume change is measured and the respective portions of liquid and of gas enclosed in each one of these isolated fractions is easily calculated. Counting the fractions isolated per unit of time makes it possible to calculate the flow rate or the total throughput of each one of the phases of the mixture from the product of the mixture flow rate and the portions of each phase in the successive fractions.

Figure 1:
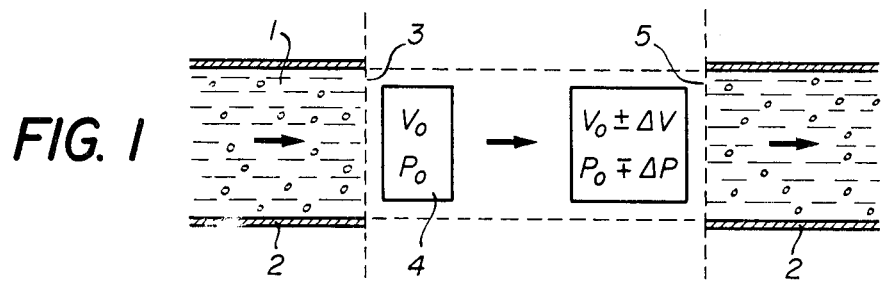

This principle is illustrated diagramatically in FIG. 1 exhibiting a gas-liquid two-phase mixture 1, flowing from left to right in a conduit 2. In a section 3 of the conduit, one samples successive fractions 4, each one occupying a predetermined volume $V_o$ at a pressure $P_o$. Each one of these successive fractions is then reinjected into the conduit 2 after having been subjected to a volume variation $\Delta V$ to which a correlative pressure variation $\Delta P$ results. From these correlative variations of volume and of pressure the respective proportions of gas and liquid enclosed in each one of these fractions may be calculated. Subsequently, using the flow rate of the mixture, one can calculate the respective flow rates of the liquid phase and of the gaseous phase of the two-phase mixture.

Determining the proportion of liquid and of gas enclosed in each of these fractions can be performed by fixing a predetermined variation of pressure $\Delta P$ and by detecting the volume for which this variation of pressure is obtained or by establishing a predetermined variation of volume and measuring the corresponding pressure variation.

The variations of volume to which each one of these fractions is subjected may be selected on the basis of the mixture to be measured. The variation can be a simple compression, a simple relaxation, or a compression followed by relaxation, etc. Since the simple compression may entail risks of overpressure and of bursting in the extreme case where the two-phase flow consists exclusively of the liquid, it is preferable to provide for additional safety means to prevent these hazards. As for the application of a simple relaxation, the accuracy of the measurements may be adversely affected in the case where the liquid phase contains a nonnegligible proportion of dissolved gas (for instance, in a mixture of liquid and gaseous hydrocarbons in equilibrium) because of the rapid degassing procedure which necessarily accompanies this decrease of pressure. In a case like this, a solution that is especially advantageous consists of applying a relaxation ($V_1 > V_o$) followed by renewed compression ($V_2 > V_1$), the gas liberated during the relaxation having no time to become slowly redissolved during the renewed compression. One can then calculate from the initial pressure $P_o$, from the pressure at the end of the relaxation $P_1$, and from the pressure at the end of the renewed compression $P_2$, the amount of gas that was in the free state, as well as the amount of gas dissolved inside each one of the fractions. In the case where the two-phase flow contains a large quantity of undissolved gas, one could advantageously perform a preliminary separation so as to obtain a liquid-gas mixture, the gas content of which does not exceed a given value. The data on the amount of gas initially separated would then be added to the data obtained in the inventive measurement process.

The determination, on the basis of the correlative variations of volume and of pressure of the proportion of liquid and of gas enclosed in each one of the fractions, can be performed either graphically, with the help of a family of standard curves established for several liquid-gas pairs, or by calculation in an automated system.

Figure 2:
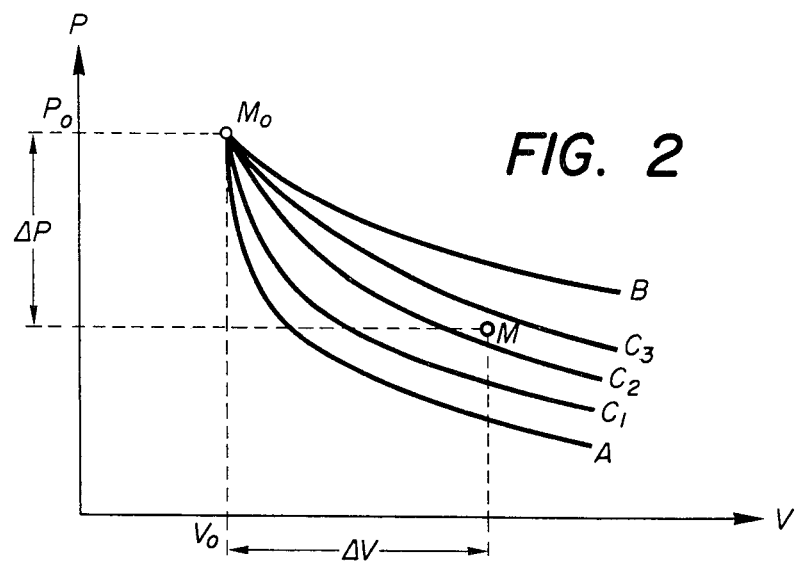

FIG. 2 illustrates an example of determination by the graphic method in the way previously described and starting with a control volume $V_o$ at the reference pressure $P_o$. In order to perform this graphic determination, a calibrated series of pressure-volume curves are used which have been derived using mixtures of a gas-liquid pair of identical composition to that of the two-phase mixture to be tested. Each one of the curves of this series corresponds to a gas-liquid mixture possessing well defined proportions (this mixture being assumed under the initial $V_o$ and $P_o$ conditions, to which the point $M_o$ corresponds, on the diagram of FIG. 2) and represents the trend of the pressure P prevailing in this mixture as a function of the variations of volume to which it is subjected. For the sake of clarity, the drawing shows only positive variations of volume; the principle, however, remains valid for negative variations. These curves as a whole cover the entire range of possible mixtures from gas alone to liquid alone. Thus the extreme curves A and B correspond respectively to the liquid alone and to the gas alone, whereas the intermediate curves ($C_1$, $C_2$, $C_3$) correspond to mixtures of increasing proportion of gas moving from the curve A toward the curve B. In order to determine the proportion of liquid and of gas in the control volume mentioned above, it suffices to transfer to the P-V diagram of FIG. 2, from the point M, the respective variations $\Delta P$ and $\Delta V$ measured in the measurement process for this control volume. The point M thus obtained makes it possible, through simple interpolation with the curves immediately adjacent to it, to determine the gas-liquid proportion.

The same determination can also be performed through calculation with the help of well known laws. In the case of a mixture of perfect liquid and gas, the gas content $X_{go}$ of a volume $V_o$ of this mixture at the pressure $P_o$ can be obtained from the $\Delta P$ and $\Delta V$ variations to which this mixture has been subjected, by the following relation:

$$X_{go} = \frac{V_{go}}{V_O} = \frac{P_o + \Delta P}{\Delta P} \times \frac{\Delta V}{V_O}$$

where $V_{go}$ designates the volume occupied by the gas within the total volume $V_o$ of the mixture. For real gas and liquid mixtures similar, although more complex, relations do exist and involve specific parameters of the components of these mixtures.

Once again, after determining the proportions of gas and liquid it only remains to determine the flow rate of the mixture, for example by counting the control volume isolated per unit of time. The respective gas and liquid flow rates can be provided from this data, according to the method of calculation used, in the form of volumetric flow rate, or in involving the density of each component, in the form of mass flow rate. The total volume or mass of the phases flowing through the measurement apparatus may also be continuously determined by integrating these flow rates over time.

FIGS. 3 to 8 illustrate various forms of apparatus for the implementation of the process of the invention. The apparatus represented on the diagram of FIG. 3 refers to the implementation of one of the variants of this process, according to which one varies the volume of each one of the fractions sampled by a predetermined amount and then measures the corresponding variation of pressure. This apparatus, designated in the drawing by the general reference 10, comprises a volumetric device 11 inserted, by means of its respective inlet 12 and outlet 13 apertures, on a conduit 14 which carries the two-phase mixture to be examined. To this device are associated a number of mechanical devices, electric circuits and display devices, to be described hereinafter.

Figure 4:
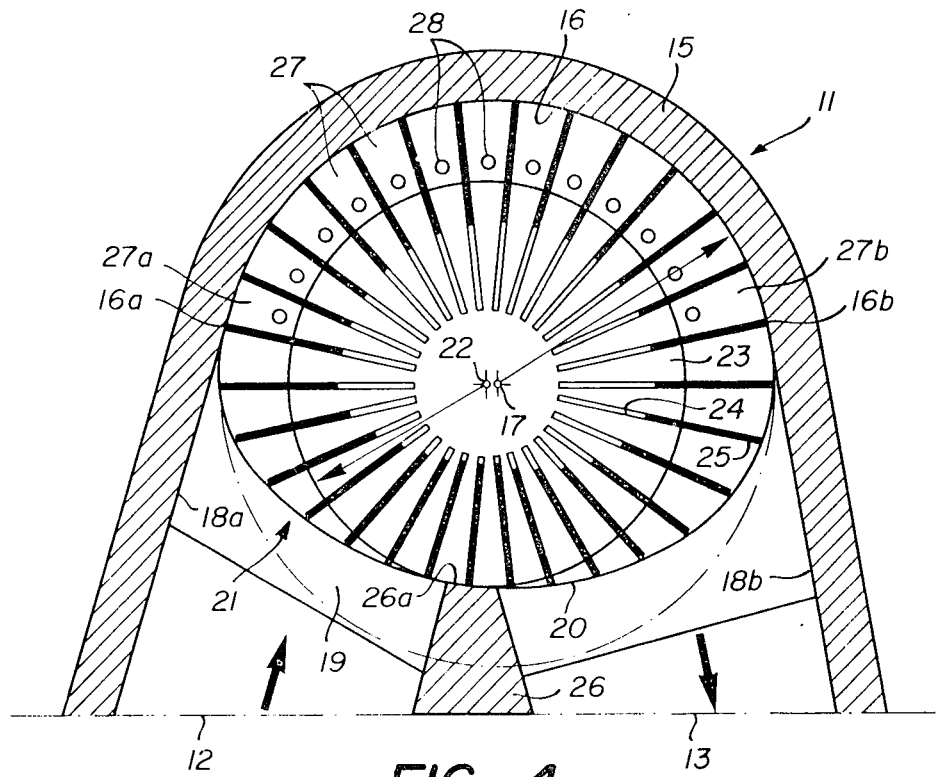
FIG. 4 is a schematic section view of apparatus of the invention.

The volumetric device 11, is designated to test the compressibility of the mixture during the passage of the two-phase mixture from the inlet aperture 12 to the outlet or discharge aperture 13, by dividing the mixture into fixed, separater, fractions isolated from one another and by subjecting each one of these mixture fractions to a fixed variation of volume. One possible design consists of adapting a known pump device (for example, see U.S. Pat. No. 2,043,963, which is incorporated herein by reference) of the type equipped with retractable vanes, in which the rotor part is in an eccentric position with respect to the stator part. FIG. 4 illustrates a volumetric device of this type 11, designed to produce a simple relaxation. This device contains a stator chamber 15 the inner surface of which comprises, in cross-section, an upper portion 16 in the shape of the arc of a circle with a center on an axis 17, two lower portions 18a and 18b, respectively situated in the extension of each one of the extreme points 16a and 16b of the upper portion 16 and lateral walls 19. The lower part of each one of the lateral walls 19 of this chamber 15 (only one of which is shown in the drawing) is provided with a bearing surface 20 intended to act as a cam, the respective extremities of which are joined to the extremities 16a and 16b of this upper section 16.

The volume situated between the lower portions 18a and 18b is distributed in two parts through a partition 26, the upper face 26a of which comes to the level of the lower part of the lateral cams 20. Partition 26 defines, in cooperation with the portions 18a and 18b and lateral walls 19, the respective inlet and outlet apertures 12 and 14 for the fluid.

Inside the static chamber a rotor 21 is mounted, the axis 22 of which is in an eccentric position with respect to the axis 17 of the chamber (the axis 22 and the axis 17, in the drawing, being situated on the same horizontal line, but the axis 22 being displaced with respect to the axis 17 to the left of this axis). Rotor 21 consists of a cylindrical body 23 provided with a number of radial grooves 24 regularly distributed around the body 23, and retractable vanes 25 mounted therein. These vanes 25 are constantly outwardly biased through means not shown in the drawing (for instance, prestressed springs housed at the bottom of the radial grooves), so that their free extremities are compelled to constantly rub during the rotation of the rotor 21 against the lateral walls 19, as well as against the upper part 16, the lateral cams 20 and the supporting face 26a of the partition (the vanes being in the most retracted position during their passage on this supporting face 26a). Vanes 25, in cooperation with the upper portion 16, from point 16a up to the point 16b, define a number of fixed, separate, closed cells 27 the respective volumes V of which increase continuously from a first predetermined volume $V_o$ for the cell 27a adjacent to the point 16a, up to a second predetermined volume $V_1$ for the cell 27b adjacent to the other point 16b. A number of pressure measuring devices 28 may be arranged at regular intervals along one of the lateral walls 19 of the chamber, so that the pressure prevailing inside these cells may be recorded. Several pressure measuring devices may be used; however, only two would be necessary to determine a pressure change due to the volume change.

Rotation is imparted to the rotor 25 (in the picture, clockwise) by the two-phase flow itself, which enters through the inlet aperture 12 and strikes the vanes 25 situated opposite this aperture. Then, during the rotation of the rotor, the flow is divided into successive fractions in the different cells 27, which fractions are subjected to continuous relaxation before issuing through the outlet aperture 13. Since relaxation supplies the energy to the system, a brake could be provided on the shaft of the rotor 25, so as to prevent this rotor from racing.

The volumetric device 11 can just as well operate in compression, in which case the inlet and outlet apertures 13 and 14 are reversed in FIG. 4. Since the compression requires energy from the outside, a motor may be needed to drive the rotor 25 in the reverse sense to the direction previously indicated (counterclockwise in FIG. 4).

Figure 3:
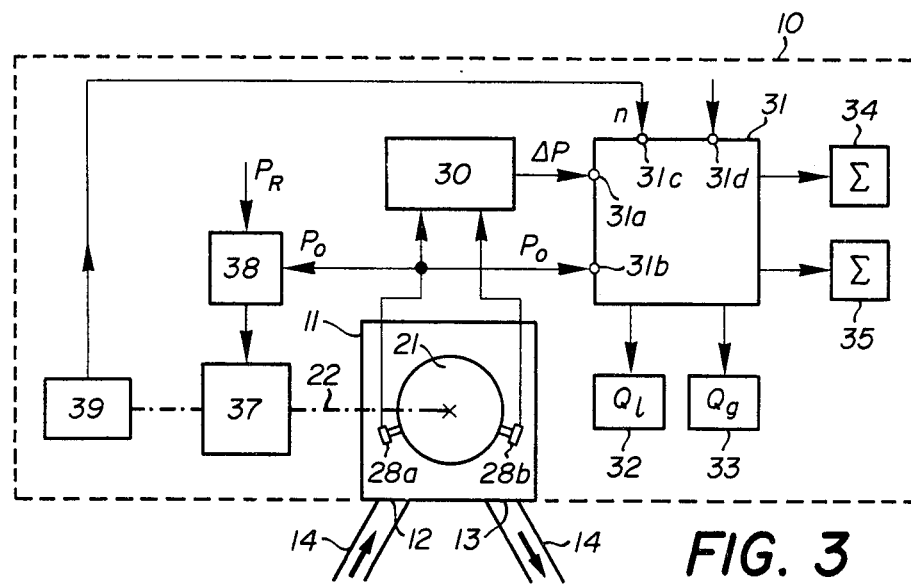
FIG. 3 is a block diagram of a measuring system according to the invention.

If one looks again at the apparatus 10 represented in FIG. 3, only two of the pressure measurement devices 28 are actually used in the volumetric device 11; that is, respectively a first pressure device 28a corresponding to the cell 27a of a first predetermined volume $V_o$ in which the initial pressure $P_o$ prevails, and a second pressure device 28b corresponding to the cell 27b of a second predetermined volume $V_1$ in which the final pressure $P_1$ prevails. These two devices 28a and 28b may be electrically connected with a subtractor 30 the role of which is to calculate the difference $\Delta P = (P_1 - P_o)$. The output of the subtractor 30 is directed toward one of the inlets 31a of a function generator 31. The device 28a is also connected directly with another inlet 31b of the function generator 31.

The shaft 22 of the rotor 21 of the volumetric device 11 may be controlled by a motion device 37 which can consist of a motor or of a brake, according to whether the volumetric device operates in compression or in relaxation as previously indicated. This motion device 37 is controlled by a regulator 38, the purpose of which is to regulate the speed of rotation $n$ of the rotor 21 of the volumetric device 11 so that the perturbation of the flow in the conduit 14 being caused by the volumetric device, can be as slight as possible. In order to obtain this, the regulator 38, receives as inputs, two pressure indications, respectively the indication of a baseline pressure $P_r$, equal for instance to the reference pressure which must prevail in the conduit 14, above the inlet aperture 12, and the indication of the pressure $P_o$ provided by the pressure measurement device 28a. According to the value of the difference recorded between the baseline pressure $P_r$ and the actual pressure $P_o$, the regulator 38 acts through the motion device 37 on the speed of rotation of the rotor so as to cause the difference to be eliminated.

At the extremity of the shaft 22 there is a tachometer 39 which permanently indicates at one of the inlets 31c of the function generator 31, at the speed of rotation $n$ of the rotor 21. In the function generator are stored various fixed data for the system (data which, for instance, can be introduced through an inlet 31d), such as the values $V_o$ and $V = (V_1 - V_o)$ and different specific parameters of a gas-liquid pair forming the flow to be measured (such as densities).

The role of this function generator 31 is to precisely determine, as a function of the different values received $V_o$, $P_o$, $\Delta V$, $\Delta P$, $n$ etc., the volumetric flow rate and/or the mass flow rate of gas and of liquid of the flow that passes through the volumetric device. This determination is performed with the help of the above-mentioned formulas introduced into the function generator in the form of logic circuits, and the results are transmitted to the respective display devices 32 and 33 connected at the outlet of the generator. With the outlet of the generator 31 are also connected two integrating devices 34 and 35, the purpose of which is to ensure the counting of the total quantities of gas and of liquid that have run through the volumetric device during a definite period.

Since in some cases the passage of the vanes on the pressure measurement devices may disturb the values provided by these devices, it might be desirable to permit the transfer of the pressure measurements in the function generator only at the moments when the vanes are no longer rubbing against the pressure devices. This transfer release can be easily worked out with the help of a rotor position pickup placed at the extremity of the rotor shaft. Instead of these intermittent transfers, electronic filtering devices which eliminate these possible disturbances can be used.

Figure 5:
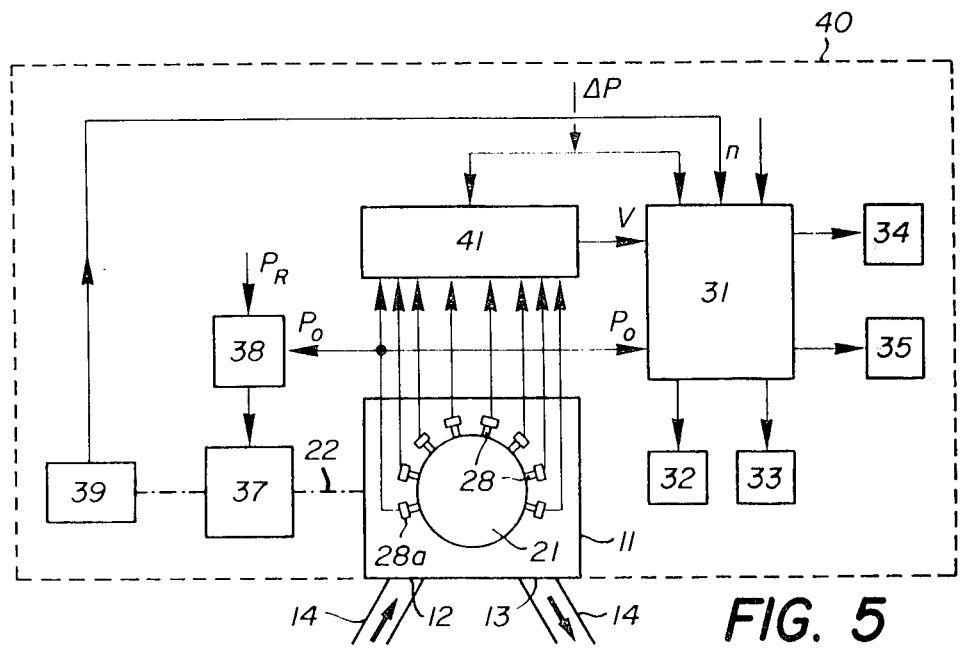
FIG. 5 is a diagram similar to that of FIG. 3 to illustrate a first variation of a measuring system.

The alternative apparatus represented in the diagram of FIG. 5 refers to the implementation of another variant of the process in accordance with the invention. According to this alternative, a predetermined pressure variation ΔP is established and the volume variation ΔV is measured for which this pressure variation ΔP corresponds. The apparatus 40 shown in the diagram of FIG. 5 is very similar from the structural standpoint to that shown in FIG. 3, however, with some differing elements (the identical elements are designated by the same reference numbers). In FIG. 5 one recognizes the volumetric device 11, the shaft 22, and the motion device 37 and the regulator 38. One recognizes also the function generator 31, at the exits of which the display devices 32 and 33 and the integrating devices 34 and 35 are connected, as well as the tachometer 39 which is connected to one of the inlets of the function generator.

In this variant, pressure measurement devices 28, are opposite each one of the cells 27 of the volumetric device 11, and are connected respectively with the different inlets of an electric circuit 41. This circuit receives a control value ΔP equal to the variation of pressure that has been predetermined, this ΔP value being also directed toward one of the inlets of the function generator 31. The purpose of the cells 27, for which the pressure variation ΔP is actually reached, and to send the corresponding value V of the volume of this cell at this position to one of the inlets of the function generator 31. The results processed by the generator 31 as a function of the data received are directed then to the display devices 32 and 33 and to the integrating devices 34 and 35.

Figure 6:
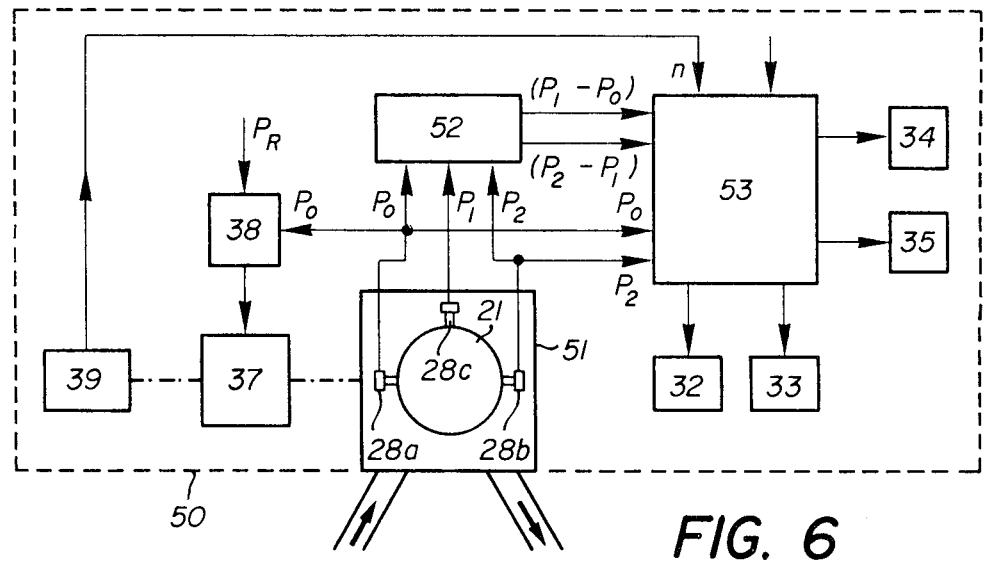
FIG. 6 is a diagram silimar to that of FIG. 3 to illustrate a second variation of a measuring system.
Figure 7:
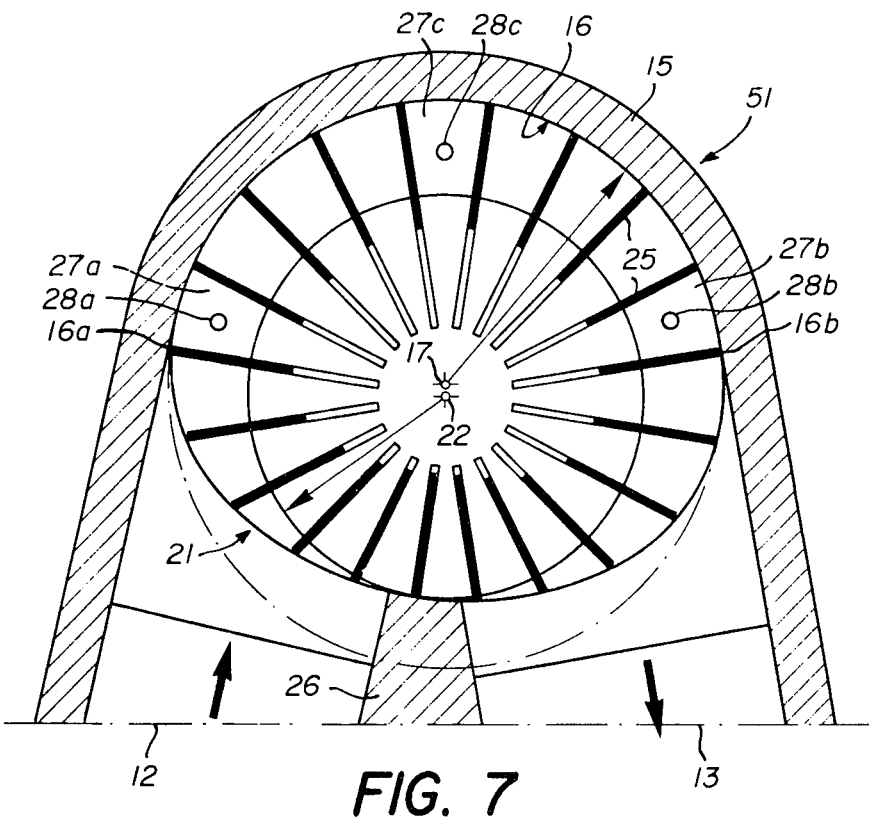
FIG. 7 is a sectional view similar to that of FIG. 4 illustrating a variation of the apparatus of the invention.

The second variant of apparatus is represented in the diagram of FIG. 6 and FIG. 7 wherein the two-phase flow is subjected to a relaxation followed by a recompression. To obtain this, one uses in the apparatus 50 of FIG. 6, a volumetric device 51 (shown in cross-section in FIG. 7), the elements of which are nearly identical to those of the volumetric device 11 represented in FIG. 4 (like elements are designated by the same reference numbers). However, the eccentricity of the rotor 21, with respect to the axis 17 of the stator chamber 15, is different than in FIG. 4. In this volumetric device, the axis 22 of the rotor 21 is arranged above the axis 17 of the stator chamber 15 and nearly on the same vertical line, so that the different cells 27, formed by the vanes 25 of the rotor 21 along with the upper part 16 of the chamber 15, are subjected, during rotation, to a change of the initial volume $V_o$ for the first cell 27a, to an intermediate volume $V_1$ larger than the volume $V_o$ (relaxation) for the cell 27c situated at the vertical of the axis 22, then from this intermediate volume $V_1$ to a final volume $V_2$ smaller than the volume $V_1$ (recompression) for the last cell 27b. The pressures $P_o$ and $P_2$, prevailing inside the respective cells 27a, 27c and 27b are measured with the help of the pressure measurement devices 28a, 28c and 28b, respectively placed opposite each of these cell positions.

The pressure measurement devices 28a, 28c and 28b are connected to the inlets of an electrical circuit 52, which calculates, as a function of the data received, the differences $(P_1 - P_o)$ and $(P_2 - P_1)$, values which later on are inputs to a function generator 53. The results processed by this function generator 53 are directed toward the display devices 32 and 33 and the integrating devices 34 and 35. One recognizes also in FIG. 6 the motion device 37, a motor or a brake depending on whether, in the volumetric device 51, compression exceeds relaxation or conversely. The regulating device 38 connected with this motion device 37 and the tachometer 39 send the speed of rotation $n$ to one of the inlets of the function generator 53.

This second variant (FIG. 6) proves to be especially advantageous, especially if one selects the arrangement of the volumetric device 51 so that the final pressure $P_2$ be lower than the initial pressure $P_o$. In this case, the external energy to be provided is low, since practically any relaxation energy is re-used for the recompression. The motor/brake unit 37 may be of small dimensions and only serve in a case of need.

Although, so far, for the implemention of the process of the invention, the volumetric device has been exclusively referred to as the "vane pump" type, it is evident that other devices can be used also for the same purpose. For instance, one can use a device of the type of the "eccentric screw pump", known on the market by the name of MOYNO pump, and other similar devices.

The process described offers, in comparison with known processes, a number of advantages, the main one residing in the possibility of measuring rates of two-phase flows exhibiting slippage between phases caused by fluctuating velocities and flowrates, without the necessity to separate these phases. The different devices that can be considered for the implementation of this process can thus assume quite a compact shape, and can also be installed on a permanent basis, or be used for intermittent verification. Among the other advantages, the accuracy of the measurements obtained is high.

We claim:
1. A method for continuously measuring the rate of flow of each phase of a concentrated gas-liquid mixture in which the phases move at fluctuating flow velocities relative to one another wherein the method comprises,
   a. dividing said mixture into fixed, separate, successive fractions of a first predetermined volume,
   b. measuring an initial pressure of said mixture in said successive fractions at the first predetermined volume,
   c. varying the volume of said mixture in said successive fractions to a second predetermined volume,
   d. measuring a final pressure of said mixture in said successive fractions at the second predetermined volume,
   e. measuring the flow rate of said mixture,
   f. determining the proportion of each phase in said mixture in said successive fractions from a comparison of the difference in the first and second predetermined volumes and the difference in initial and final pressures of said mixture in said successive fractions, and
   g. determining the rate of flow of each phase in said mixture from the flow rate of said mixture and the proportion of each phase in said mixture in successive fractions.

2. A method for continuously measuring the rate of flow of each phase of a concentrated gas-liquid mixture in which the phases move at fluctuating flow velocities relative to one another wherein the method comprises,
   a. dividing said mixture into fixed, separate, successive fractions of a first predetermined volume,
   b. measuring an initial pressure of said mixture in said successive fractions at the first predetermined volume,
   c. reducing the volume of said mixture in said successive fractions to a second predetermined volume less than the first predetermined volume,
   d. measuring a final pressure of said mixture in said successive fractions at the second predetermined volume,
   e. measuring the flow rate of said mixture, f. determining the proportion of each phase in said mixture in said successive fractions from a comparison of the difference in the first and second predetermined volumes and the difference in initial and final pressures of said mixture in said successive fractions, and g. determining the rate of flow of each phase in said mixture from the flow rate of said mixture and the proportion of each phase in said mixture in successive fractions.

3. The method of deriving data for the calculation of the rate of flow of each phase in a concentrated gas-liquid mixture in which the phases move at fluctuating flow velocities relative to one another wherein the method comprises, a. dividing said mixture into fixed, separate, successive fractions of a first predetermined volume,
  b. measuring an initial pressure of said mixture in said successive fractions at the first predetermined volume,
  c. reducing the volume of said mixture in said successive fractions to a second predetermined volume less than the first predetermined volume,
  d. measuring a final pressure of said mixture in successive fractions at the second predetermined volume, and
  e. measuring the flow rate of said mixture.

4. Apparatus for continuously determining the rate of flow of each phase in a concentrated gas-liquid mixture in which the flow velocities of the phases are fluctuating relative to one another comprising, a. means for measuring the flow rate of said mixture,
  b. means for dividing said mixture into fixed, separate successive fractions of a first predetermined volume,
  c. means for varying the volume of said mixture from the first predetermined volume to a second predetermined volume,
  d. means for measuring the change in pressure of the mixture resulting from the volume change from the first predetermined volume to the second predetermined volume,
  e. means for determining the proportions of each phase in successive fractions of said mixture from a comparison of the volume variation and pressure change of said mixture in successive fractions, and
  f. means for determining the rate of flow of each phase from the flow rate of said mixture and the proportions of each phase in successive fractions of said mixture.

5. A method for continuously measuring the rate of flow of each phase of a concentrated gas-liquid mixture in which the phases move at fluctuating flow velocities relative to one another wherein the method comprises, a. dividing said mixture into fixed, separate, successive fractions of a first predetermined volume,
  b. measuring an initial pressure of said mixture in said successive fractions at the first predetermined volume,
  c. varying the volume of said mixture in said successive fractions to a second predetermined volume,
  d. measuring a final pressure of said mixture in said successive fractions at the second predetermined volume,
  e. determining the flow rate of said mixture at either the initial or final pressure from the respective volume and the number of fractions isolated per unit time,
  f. determining the proportion of each phase in said mixture at either pressure in said successive fractions from a comparison of the difference in the first and second predetermined volumes and the difference in initial and final pressures of said mixture in said successive fractions, and
  g. determining the rate of flow of each phase in said mixture at either pressure from the flow rate of said mixture and the proportion of each phase in said mixture in successive fractions at the selected initial or final pressure.

6. A method for continuously measuring the throughput at a selected initial or final pressure of each phase of a concentrated gas-liquid mixture in which the phases move at fluctuation flow velocities relative to one another wherein the method comprises, a. dividing said mixture into fixed, separate, successive fractions of a first predetermined volume,
  b. measuring an initial pressure of said mixture in said successive fractions at the first predetermined volume,
  c. varying the volume of said mixture in successive fractions to a second predetermined volume,
  d. measuring a final pressure of said mixture in said successive fractions at the second predetermined volume,
  e. determining the proportion of each phase in said mixture at either selected pressure in said successive fractions from a comparison of the difference in the first and second predetermined volumes and the difference in initial and final pressures of said mixture in said successive fractions, and
  f. determining the throughput of each phase in said mixture at either selected pressure by a summation of the products of the proportion of each phase in each successive fraction times the volume of each successive fraction at either selected pressure.

7. Apparatus for continuously determining the rate of flow of each phase in a concentrated gas-liquid mixture in which the flow velocities of the phases are fluctuating relative to one another comprising, a. means for dividing said mixture into fixed, separate successive fractions of a first predetermined volume,
  b. means for varying the volume of said mixture from the first predetermined volume to a second predetermined volume,
  c. means for measuring the change in pressure of the mixture from an initial to a final value, resulting from the volume change from the first predetermined volume to the second predetermined volume,
  d. means for determining the proportions of each phase in successive fractions of said mixture from a comparison of the volume variation and the pressure change of said mixture in successive fractions,
  e. means for determining the flow rate of said mixture at either the initial or final pressure from the respective volume and the number of fractions isolated per unit time, and
  f. means for determining the rate of flow of each phase at either the initial or final pressure from the flow rate of said mixture and the proportions of each phase in successive fractions of said mixture at the selected initial or final pressure.

8. Apparatus for continuously determining the throughput at a selected initial or final pressure of each phase in a concentrated gas-liquid mixture in which the flow velocities of the phases are fluctuating relative to one another comprising,
 a. means for dividing said mixture into fixed, separate, successive fractions of a first predetermined volume,
 b. means for varying the volume of said mixture from the first predetermined volume to a second predetermined volume,
 c. means for measuring the change in pressure of the mixture from an initial to a final value, resulting from the volume change from the first predetermined volume to the second predetermined volume,
 d. means for determining the proportions of each phase in successive fractions of said mixture from a comparison of the volume variation and the pressure change of said mixture in successive fractions, and
 e. means for calculating and summing the products of the volume of each fraction times the proportions of each phase in each fraction at either selected pressure.

* * * * *

UNITED STATES PATENT OFFICE
CERTIFICATE OF CORRECTION

PATENT NO. : 4,056,002
DATED : November 1, 1977
INVENTOR(S) : Simon Arieh and Jean-Pierre Budliger It is certified that error appears in the above-identified patent and that said Letters Patent are hereby corrected as shown below:

Column 3, line 22, "$(V_2 > V_1)$" should read ---$(V_2 < V_1)$---.

Signed and Sealed this

Seventh Day of February 1978

[SEAL]

Attest:

RUTH C. MASON
*Attesting Officer*

LUTRELLE F. PARKER
*Acting Commissioner of Patents and Trademarks*